Nov. 16, 1948.  E. MOLLOY ET AL  2,454,081
ARRESTING GEAR
Filed July 25, 1935  2 Sheets-Sheet 1
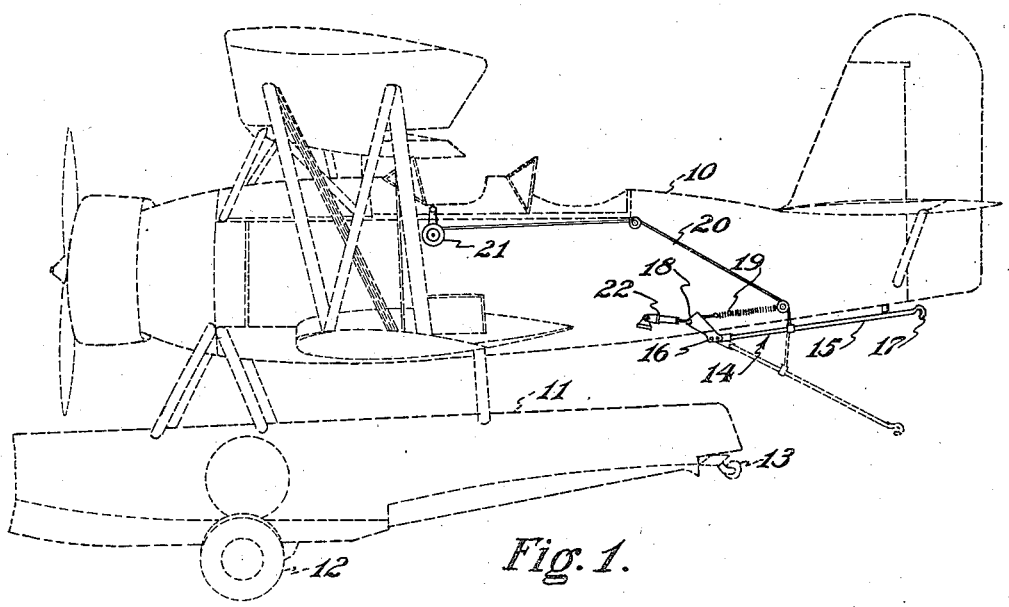
INVENTORS
EDDIE MOLLOY and
LOUIS G. RAICHE
BY
ATTORNEYS.

Nov. 16, 1948.  E. MOLLOY ET AL  2,454,081
ARRESTING GEAR
Filed July 25, 1935  2 Sheets-Sheet 2
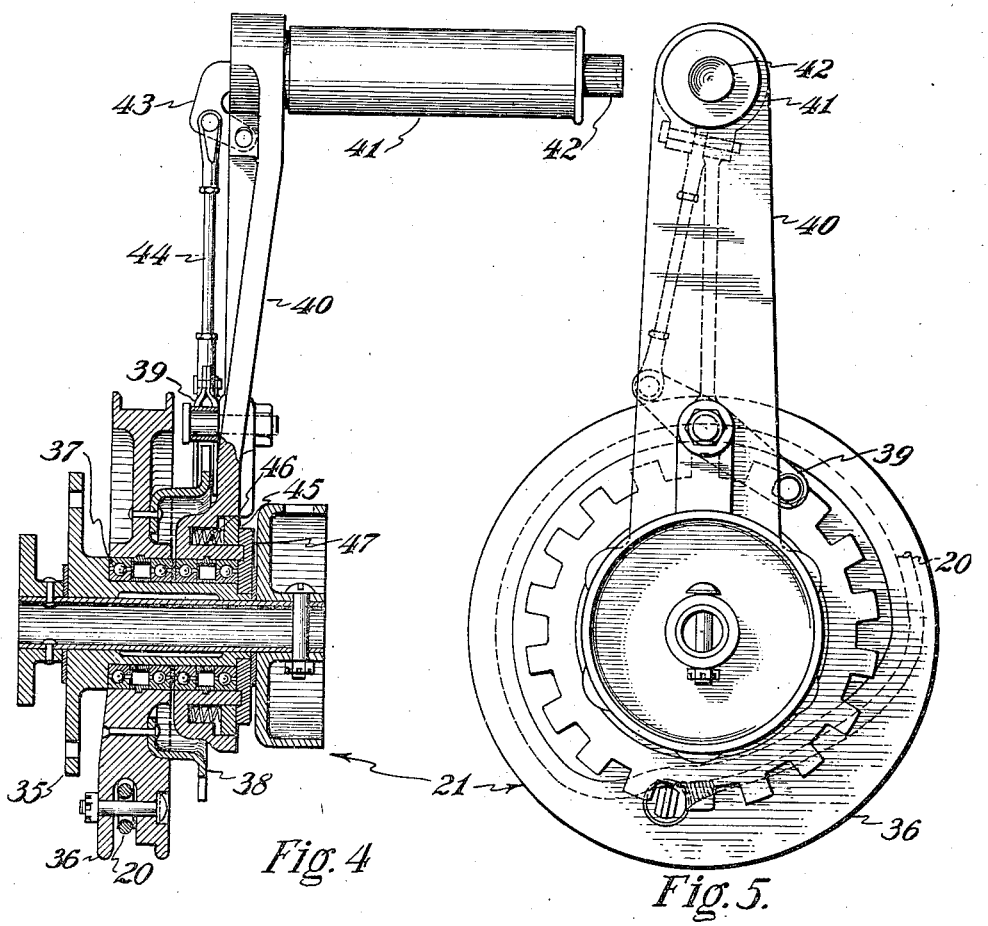
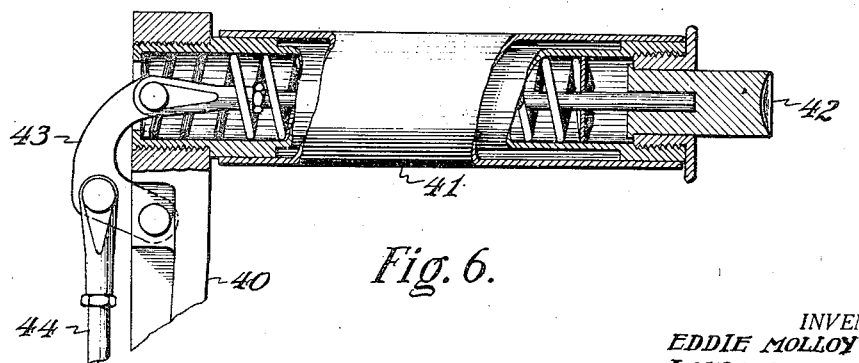
INVENTORS
EDDIE MOLLOY
LOUIS G. RAICHE
BY
ATTORNEYS Patented Nov. 16, 1948

2,454,081

UNITED STATES PATENT OFFICE 2,454,081

ARRESTING GEAR

Eddie Molloy, Buffalo, and Louis G. Raiche, Kenmore, N. Y., assignors, by mesne assignments, to Curtiss-Wright Corporation, New York, N. Y., a corporation of New York Application July 25, 1935, Serial No. 33,046

6 Claims. (Cl. 244—110)

This invention relates to improvements in arresting gears for use in connection with aircraft of the type adapted to land upon restricted landing areas.

Objects of the invention are to provide a retractable arresting gear for use with amphibian aircraft.

A further object is to provide a retracting and extending mechanism for a relatively long arresting hook.

Still another object is to provide means for preventing the bouncing of an arresting hook upon impact thereof with a landing surface.

Another object is to provide a pneumatic dashpot mechanism for reducing the bouncing tendencies of an arresting gear.

Another object is to provide a pneumatic dashpot organization having maximum effectiveness toward one end of its stroke, the dashpot being organized for full movement between its extremes, for the extension and retraction of an arresting hook with which it is associated.

A still further object is to provide a novel mechanism for releasing an arresting gear from its retracted position by which it may move to the landing position, the same means being organized for retracting the arresting gear when it is no longer needed in the landing position.

Further objects will become apparent from a reading of the subjoined specification and claims, and from an examination of the accompanying drawings, in which similar numbers indicate similar parts, and in which:

Fig. 1 is a diagrammatic side elevation of an aircraft equipped with the arresting gear of this invention;

Fig. 2 is a side elevation, partly in section, showing the pneumatic dashpot of the arresting gear;

Fig. 3 is a section on the line 3—3 of Fig. 2;

Fig. 4 is a section through the retracting and extending mechanism within the aircraft;

Fig. 5 is a front elevation of the retracting and extending mechanism; and

Fig. 6 is an elevation, partly in section, showing the handle details of the retracting and extending mechanism.

Fig. 1 shows an amphibian aircraft of conventional form, including a fuselage 10 mounted upon a seaplane float 11, the latter having a retractable wheeled landing gear 12. The float 11 is also provided with a tail wheel 13. This type of aircraft is adapted for alighting upon land or water and is suited for use on the decks of aircraft carriers where the landing area is restricted. For such use, however, it is necessary to provide an arresting gear organization designated in its entirety as 14, the arresting gear comprising a shank 15 pivoted at 16 to the aircraft fuselage and having at its extreme end a hook 17, which, when the shank 15 is lowered, is adapted to engage with transverse cables stretched across the landing area. The shank 15 is retracted, as shown in full lines in Fig. 1, against the bottom of the fuselage when the aircraft is in flight or when the craft is operating upon the water. In order to extend the gear rapidly, the shank 15 is projected at 18 above the pivot 16, and a spring 19 is fixed at its ends to the extension 18 and to a portion of the aircraft fuselage. Consequently, the spring tends to urge the shank to its lowermost or landing position. A cable 20 is shackled to the shank 15, and is passed over suitable pulleys within the aircraft fuselage to a crank organization 21. By this means, when the cable is wound upon a drum forming part of the crank mechanism, the hook is withdrawn, and when the crank mechanism is released, the hook moves to its landing position.

Thus far, the arresting gear organization has no specific points of novelty. It should be noted, however, that with seaplane type of aircraft, the shank 15 must be considerably longer than it might be in the case of an aircraft having only a wheeled landing gear. Thereby, the weight and inertia of the shank 15 becomes quite large, and it has been found necessary to provide some means for damping the bouncing movement of the shank when the hook 17 engages the landing surface. To this end, we provide a pneumatic dashpot device 22, connected at its ends to the extension 18 and to a fixed part of the aircraft fuselage. This device, shown in detail in Figs. 2 and 3, comprises a cylinder 23 closed at one end by a screw cap 24 having an eye 25 for pin attachment to the fuselage. A piston 26, having leather packings 27, engages the inner walls of the cylinder and is mounted upon a piston rod 28 extending through a closure 29 at the opposite end of the cylinder. There will normally be a slight amount of air leakage between the piston rod 28 and the closure 29, and past the piston 26. The device is shown in Fig. 2 in a retracted position of the arresting gear, the piston rod 28 having a fitting 30 for attachment to the extension 18.

Upon extension of the arresting gear under the influence of the spring 19, the piston 26 is drawn to the right along the cylinder, tending to compress the air to the right of the piston and tending to cause a slight vacuum to the left of the piston. Upon passing approximately the mid point of the cylinder, the piston uncovers a check valve 31 so constructed as to permit the entry of air within the cylinder, but to prevent the egress of air therefrom. Thus, upon passing the check valve 31, the low pressure space to the left of the piston is opened to the atmosphere by which the pressure in the space to the left of the piston becomes atmospheric, while that to the right is under compression.

At the right of the cylinder a jacket 32 is formed having ports 33 through the extreme right end of the cylinder wall effecting communication between the cylinder and the jacket. Additional ports 34 are formed in the cylinder wall, communicating with the jacket, at a distance from the right end of the cylinder slightly greater than the total thickness of the piston 26. Thus, as the piston moves to the right, air passes through both the ports 33 and 34 and is compressed within the jacket. As the piston passes to the right, the compression of air to the right of the piston gives a damping effect to prevent the sudden extension of the arresting gear when released to the landing position. Slight leakage of air, along with the tension of the spring 19 and the weight of the arresting gear, will cause its full movement to the landing position. Upon such full movement, the ports 33 will lie to the right of the piston and the ports 34 will lie to the left thereof, permitting communication between the spaces to the right and left of the piston through the jacket 32, and transferring the compressed air from the right side to the left side of the piston.

Upon impact of the arresting hook with the landing surface, the hook will tend to bounce upwardly, moving the piston to the left in the cylinder 23, thus compressing the air to the left of the piston. When so compressed, air may not escape through the valve 31 since, as previously mentioned, this is a check valve preventing the egress of air from the cylinder. The spring 19, along with the compressed air in the cylinder will tend to return the arresting hook immediately to a landing position and, in fact, prevent bouncing thereof. As the aircraft effects a landing, the arresting hook is raised somewhat by which the spring 19 is placed under tension and the piston is moved to the left in the cylinder. Thereupon, the landing hook is disengaged from the cables upon the landing surface and the pilot may retract the arresting hook by means of the crank mechanism 21. In so retracting the hook, the piston is moved to the left within the cylinder, gradually, and the normal leakage of air permits this movement without undue exertion upon the part of the pilot. If desired, a small vent may be provided to augment the gradual leakage of air. When the arresting gear is retracted, the slight suction in the right part of the cylinder caused by movement of the piston to the left, will be overcome, as soon as the piston moves to the left past the valve 31, by entry of air through the valve. It has been found in actual practice that this device has been extremely effective in damping bouncing of arresting gears.

Figs. 4, 5 and 6 show the crank mechanism 21 in detail, this mechanism comprising a support 35 fixed to the aircraft structure and providing a journal upon which a drum 36 is mounted upon anti-friction bearings 37. The end of the cable 20 is fixed to the drum and is wound thereon. The drum is provided with a notched disc 38 engageable by a pawl 39 carried by a crank 40, the crank being rotatably mounted upon the support 35. The crank 40 is provided with a turning handle 41 and a release button 42 acting through a lever 43 and a rod 44 to raise the pawl 39 from engagement with the notched disc 38 upon pressing of the button 42. The crank 40, at its hub end, is provided with a notched member 45 pressed outwardly by springs 46 to engage a notched plate 47 fixed to the support 35, the notches of the element 45 being formed to provide a one-way clutch to permit of turning of the crank 40 in one direction, but locking it from reverse rotation. The operation of the crank mechanism is as follows. Assuming the arresting gear to be in its landing position, it is desired to retract the arresting gear, whereupon the pilot or crew member of the aircraft turns the crank 40 in the direction of rotation of which it is capable. The crank, by the engagement of the pawl 39 with the notched disc 38, thereby turns the drum 36 to wind the cable 20 thereon, thus retracting the arresting gear. This operation may, of course, be performed at leisure after the aircraft has made ground contact. The arresting gear is held in the retracted position with the cable 20 under tension, since the mechanism including elements 45, 46 and 47 prevents the crank 40, and hence the drum 36, from unwinding the cable. Assuming the aircraft is in flight and is preparing to land, the pilot desires to lower the arresting gear quickly, whereupon he presses the button 42 causing release of the pawl 39 from the notched disc 38, the drum 36 then being free from the crank. The weight of the arresting gear and the action of the spring 19, quickly lowers the arresting gear to its landing position with no additional effort by the pilot than to push the button 42. In older types of arresting gear operating mechanism, it has been necessary for the pilot to either unwind the cable from a drum, or to move a reciprocating slide a substantial distance within the cockpit. With the relatively long arresting gear shanks for which this invention is particularly adapted, this would involve a considerable amount of movement of the operating element. With this device, practically no movement is required for extending the arresting gear, and the mechanical advantage afforded by the crank and drum organization permits of easy retraction of the arresting gear after a landing.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

What is claimed is:

1. In aircraft including an arresting hook assembly pivoted to the aircraft for vertical oscillation, a device for preventing hook bouncing upon impact thereof with a landing surface comprising cylinder means and piston means engaging said cylinder means, one said means being attached to the aircraft and the other to the arresting hook, said cylinder having spaced and interconnected ports for by-passing air from one end of said cylinder to the other upon movement of said piston to a position between said ports.

2. A shock absorber for aircraft arresting gears comprising a closed end cylinder hinged to said aircraft, a piston engaging within said cylinder and hinged to said arresting gear, means encircling the rod of said piston forming a closure for the other end of said cylinder, said cylinder having communicating wall ports, one set thereof being located adjacent said closure and the other set being spaced from said first set by a distance not less than the thickness of said piston, said piston being adapted upon extension of said arresting gear to pass between said sets of ports to establish communication between the cylinder spaces on each side of the piston.

3. Aircraft arresting gear, comprising a hook pivoted at one end to an aircraft structure, pneumatic means to damp rebound of the hook including a cylinder having spaced apart ports adjacent one end, a piston in said cylinder of width somewhat less than the space between said ports, means connecting said piston to said hook, and means to retract said hook including a cable, a drum, and a crank disconnectible from said drum at will of the operator.

4. In an aircraft, an arresting gear comprising a hook assembly pivoted to the aircraft, means for quickly urging said hook to extended position, means for damping the extension movement of said hook prior to complete extension of said hook, and means to retard rebound movement of said hook from its extended position.

5. In an aircraft, an arresting gear comprising a hook assembly pivoted to the aircraft, means for quickly urging said hook to extended position, means operative to snub the extension movement of said hook prior to complete extension of said hook, and means operative to retard rebound movement of said hook from its extended position, said last named means being at least in part responsive to said snubbing operation.

6. In an aircraft, an arresting gear adapted to be extended relative to said aircraft, means for quickly urging said arresting gear to its extended position, means for damping extension movement of said gear prior to its complete extension, and means to retard rebound movement of said gear from its extended position.

EDDIE MOLLOY.
LOUIS G. RAICHE.

REFERENCES CITED

The following references are of record in the file of this patent:

UNITED STATES PATENTS

| Number | Name | Date |
|---|---|---|
| 1,068,165 | Peterson | July 22, 1913 |
| 1,749,438 | Minshall | Mar. 4, 1930 |
| 1,816,228 | Minshall | July 28, 1931 |
| 1,893,591 | Minshall | Jan. 10, 1933 |
| 2,009,356 | Seversky | July 23, 1935 |

FOREIGN PATENTS

| Number | Country | Date |
|---|---|---|
| 598,483 | France | Sept. 28, 1925 |